(12) United States Patent
Contreras et al.

(10) Patent No.: US 10,787,600 B2
(45) Date of Patent: Sep. 29, 2020

(54) COMPOSITION OF ENCAPSULATED CHEMICAL ADDITIVES AND METHODS FOR PREPARATION OF THE SAME

(71) Applicant: SAUDI ARABIAN OIL COMPANY, Dhahran (SA)

(72) Inventors: Elizabeth Q. Contreras, Houston, TX (US); B. Raghava Reddy, Pearland, TX (US)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 16/230,498

(22) Filed: Dec. 21, 2018

(65) Prior Publication Data

US 2019/0203099 A1    Jul. 4, 2019

Related U.S. Application Data

(60) Provisional application No. 62/612,756, filed on Jan. 2, 2018.

(51) Int. Cl.
*C09K 8/467* (2006.01)
*C04B 24/16* (2006.01)
(Continued)

(52) U.S. Cl.
CPC .......... *C09K 8/467* (2013.01); *C04B 20/1037* (2013.01); *C04B 24/166* (2013.01);
(Continued)

(58) Field of Classification Search
CPC ... C09K 8/467; C04B 24/166; C04B 40/0046; C04B 40/0641; C04B 2103/408; E21B 33/14
See application file for complete search history.

(56) References Cited

U.S. PATENT DOCUMENTS 3,429,827 A    2/1969    Ruus
3,511,314 A    5/1970    Scott et al.
(Continued)

FOREIGN PATENT DOCUMENTS

GB    1229689    4/1971
JP    2004131361 A    4/2004
(Continued)

OTHER PUBLICATIONS

International Search Report and Written Opinion for related PCT application PCT/US2017/052367 dated Jan. 9, 2018.
(Continued)

*Primary Examiner* — Crystal J Miller
(74) *Attorney, Agent, or Firm* — Bracewell LLP; Constance Gall Rhebergen

(57) ABSTRACT

Embodiments provide a method of encapsulating a solid cement additive. The method includes the step of applying a base film-forming monomer to the solid cement additive. The method includes the step of forming a coating layer surrounding the solid cement additive. The coating layer includes the base film-forming monomer. The method includes the step of applying an overlay film-forming monomer to the coating layer surrounding the solid cement additive. The method includes the step of reacting the base film-forming monomer and the overlay film-forming monomer to produce a polymer shell. The solid cement additive includes solid particles useful in cementing applications. The polymer shell includes a crosslinked polymer. The polymer shell surrounds the solid cement additive. The polymer shell has a permeability to water allowing controlled release of the solid cement additive.

11 Claims, 3 Drawing Sheets

(51) Int. Cl.
| | |
|---|---|
| *C04B 40/00* | (2006.01) |
| *E21B 33/14* | (2006.01) |
| *C04B 40/06* | (2006.01) |
| *C04B 20/10* | (2006.01) |
| *C09K 8/487* | (2006.01) |
| *C04B 28/02* | (2006.01) |
| *C04B 103/40* | (2006.01) |

(52) U.S. Cl.
CPC .......... *C04B 28/02* (2013.01); *C04B 40/0046* (2013.01); *C04B 40/0641* (2013.01); *C09K 8/487* (2013.01); *E21B 33/14* (2013.01); *C04B 2103/408* (2013.01)

(56) References Cited

U.S. PATENT DOCUMENTS

| | | | |
|---|---|---|---|
| 3,623,330 A | 11/1971 | Nakade et al. | |
| 4,324,683 A | 4/1982 | Lim et al. | |
| 4,632,186 A | 12/1986 | Boncan et al. | |
| 5,049,167 A | 9/1991 | Castro et al. | |
| 5,095,987 A | 3/1992 | Weaver et al. | |
| 5,164,099 A | 11/1992 | Gupta et al. | |
| 5,211,234 A | 5/1993 | Floyd | |
| 5,368,102 A | 11/1994 | Dewprashad et al. | |
| 5,613,559 A | 3/1997 | Dillenbeck, III | |
| 5,705,233 A | 1/1998 | Denes et al. | |
| 6,527,051 B1 | 3/2003 | Reddy et al. | |
| 2,554,071 A1 | 4/2003 | Reddy et al. | |
| 6,554,071 B1 | 4/2003 | Reddy et al. | |
| 6,645,288 B1 | 11/2003 | Dargaud et al. | |
| 6,722,434 B2 | 4/2004 | Reddy et al. | |
| 6,761,220 B2 | 7/2004 | Blauch et al. | |
| 6,786,963 B2 | 9/2004 | Matherly et al. | |
| 7,363,978 B2 | 4/2008 | Welton et al. | |
| 8,029,709 B2 | 10/2011 | Wu et al. | |
| 8,251,143 B2 | 8/2012 | Drochon et al. | |
| 8,383,031 B2 | 2/2013 | Naji et al. | |
| 8,420,576 B2 * | 4/2013 | Eoff ............... | C09K 8/508 166/270 |
| 8,623,793 B2 * | 1/2014 | Eoff ............... | C09K 8/508 166/270 |
| 8,689,873 B2 | 4/2014 | Abad et al. | |
| 8,822,386 B2 | 9/2014 | Quintero et al. | |
| 8,945,279 B2 | 2/2015 | Aines et al. | |
| 10,077,336 B2 * | 9/2018 | Peretolchin ............ | C08L 79/04 |
| 2004/0171499 A1 | 9/2004 | Ravi et al. | |
| 2005/0203226 A1 | 9/2005 | Mader et al. | |
| 2006/0052251 A1 | 3/2006 | Anderson et al. | |
| 2006/0144300 A1 | 7/2006 | Touzet et al. | |
| 2006/0264332 A1 | 11/2006 | Welton et al. | |
| 2011/0034351 A1 * | 2/2011 | Eoff ............... | C09K 8/508 507/212 |
| 2011/0086941 A1 | 4/2011 | Therond et al. | |
| 2011/0226690 A1 | 9/2011 | Kalayci | |
| 2012/0165428 A1 | 6/2012 | Tilara et al. | |
| 2012/0252987 A1 * | 10/2012 | Peretolchin ........... | C04B 24/166 525/523 |
| 2012/0264885 A1 * | 10/2012 | Eoff ............... | C09K 8/508 525/296 |
| 2013/0292118 A1 * | 11/2013 | Nguyen ............... | C09K 8/62 166/280.1 |
| 2014/0162910 A1 * | 6/2014 | Braley ............... | C09K 8/42 507/120 |
| 2014/0262262 A1 | 9/2014 | Zheng et al. | |
| 2015/0099674 A1 | 4/2015 | Lee et al. | |
| 2015/0129207 A1 | 5/2015 | Bastuba et al. | |
| 2015/0159079 A1 | 6/2015 | Huh et al. | |
| 2016/0017688 A1 | 1/2016 | Chatterji et al. | |
| 2016/0068745 A1 | 3/2016 | Conway | |
| 2016/0362594 A1 | 12/2016 | Rojas et al. | |
| 2017/0058191 A1 | 3/2017 | Mahoney et al. | |
| 2017/0073574 A1 | 3/2017 | Mcdaniel et al. | |
| 2017/0349805 A1 | 12/2017 | Musso et al. | |
| 2018/0237680 A1 * | 8/2018 | Hall ............... | C09K 8/03 |
| 2018/0273836 A1 * | 9/2018 | Singh ............... | C09K 8/887 |

FOREIGN PATENT DOCUMENTS

| | | |
|---|---|---|
| WO | 2014204677 A1 | 12/2014 |
| WO | 2017137789 A1 | 8/2017 |

OTHER PUBLICATIONS

International Search Report and Written Opinion for related PCT application PCT/US2018/066992 dated Mar. 19, 2019.

* cited by examiner

COMPOSITION OF ENCAPSULATED CHEMICAL ADDITIVES AND METHODS FOR PREPARATION OF THE SAME

RELATED APPLICATION

This application is related to, and claims priority from, U.S. Provisional Patent Application No. 62/612,756, filed on Jan. 2, 2018, the disclosure of which is incorporated herein by reference in its entirety.

BACKGROUND

1. Technical Field

Embodiments of the disclosure relate to chemical additives useful in cementing applications. In particular, embodiments of the disclosure relate to encapsulated chemical additives for controlled release applications in cement slurries under downhole conditions.

2. Related Art

In many wellbores, cement can be used to form an annular barrier layer between a casing and the formation, or between two casings. Design of cement slurries employed to seal the annuli requires addition of several additives. The additives are incorporated to address requirements for safe and effective placement of a cement slurry in downhole conditions, and setting of the cement slurry into a competent sealant for the duration of the well life. Some additives, such as set accelerators and set retarders, are designed to control set times at downhole temperatures. Some additives, such as cement dispersants and viscosifiers, are designed to control slurry rheologies, such that the cement slurries can be pumped and placed in the zone of interest without the use of excessive injection pressures. Additives, such as fluid loss control agents, can be used to prevent loss of the mixing fluid into the formation, causing dehydrated cement columns and bridges. Additives, such as gas migration control additives, can also be added to cement slurries when they are placed against formations that contain gases under pressure. The gas migration control additives function either by shortening the duration during which the cement paste is vulnerable to gas penetration, such gas penetration capable of forming permanent flow channels in the set cement, or prevent the slurry from premature gelation prior to hydration.

One problem encountered in cement slurry design is excessive slurry viscosities at the mixing time due to the addition of viscosifiers to compensate for any thermal thinning while pumping the slurry downhole. Another problem in designing cement slurries is due to detrimental competitive adsorption on cement surfaces between fluid loss additives, some classes of dispersants and retarders and render them less effective than they would be in the absence of such fluid loss additives. An operationally impractical way to handle such problems would be to add sequentially different additives to slurries, for example, by injecting the additives into the slurries at different times. Thus, there is a need to develop additives modified such that they are released into slurries in a sequential manner even when added together with all the other additives.

SUMMARY

Embodiments of the disclosure relate to chemical additives useful in cementing applications. In particular, embodiments of the disclosure relate to encapsulated chemical additives for controlled release applications in cement slurries under downhole conditions.

In a first aspect, a method of encapsulating a solid cement additive is provided. The method includes the step of applying a base film-forming monomer to the solid cement additive. The method includes the step of forming a coating layer surrounding the solid cement additive. The coating layer includes the base film-forming monomer. The method includes the step of applying an overlay film-forming monomer to the coating layer surrounding the solid cement additive. The method includes the step of reacting the base film-forming monomer and the overlay film-forming monomer to produce a polymer shell. The solid cement additive includes solid particles useful in cementing applications. The polymer shell includes a crosslinked polymer. The polymer shell surrounds the solid cement additive. The polymer shell has a permeability to water allowing controlled release of the solid cement additive.

In certain aspects, the base film-forming monomer includes a hydrophobic monomer and the overlay film-forming monomer includes a hydrophilic monomer. In certain aspects, the hydrophobic monomer includes carboxylic acid chlorides, carboxylic acid anhydrides, and combinations of the same. In certain aspects, the hydrophilic monomer includes para-phenylenediamine, meta-phenylenediamine, ethylenediamine, hexamethylenediamine, polyethyleneimines, polyetheramines, and combinations of the same.

In certain aspects, the base film-forming monomer includes a hydrophilic monomer and the overlay film-forming monomer includes a hydrophobic monomer. In certain aspects, the hydrophilic monomer includes para-phenylenediamine, meta-phenylenediamine, ethylenediamine, hexamethylenediamine, polyethyleneimines, polyetheramines, and combinations of the same. In certain aspects, the hydrophobic monomer includes carboxylic acid chlorides, carboxylic acid anhydrides, and combinations of the same. In certain aspects, the hydrophobic monomer is an acyl chloride containing two or more acid chloride groups. In certain aspects, the carboxylic acid chlorides includes tricarboxyl acid chlorides, dicarboxylic acid chlorides, and combinations of the same. In certain aspects, the tricarboxyl acid chloride includes 1,3,5-benzenetricarbonyl trichloride. In certain aspects, the dicarboxylic acid chloride includes sebacoyl chloride, adipoyl chloride, and combinations of the same. In certain aspects, the carboxylic acid anhydride includes hexanedioic di(2,4,6-trimethylbenzoic acid, 1,4-phthalic di(2,4,6-trimthylbenzoic) anhydride.

In certain aspects, the solid cement additive includes set accelerators, anti-gas migration additives, viscosifying agents, fluid loss control agents, cement dispersants, retarders, salts, polymers, and combinations of the same. In certain aspects, the size of the solid particles is less than about 500 micrometers. In certain aspects, the amount of the base film-forming monomer in the coating layer is in the range from about 1 weight percent (wt. %) to about 25 wt. % of the solid cement additive.

In certain aspects, the crosslinked polymer includes polyamides, aramides, and combinations of the same.

In a second aspect, a method of using an encapsulated additive in a cementing application is provided. The method includes the step of mixing the encapsulated additive with a cement slurry to produce an additive slurry. The cement slurry includes a cement and a mix water. The encapsulated additive is formed by the step of applying a base film-forming monomer to a solid cement additive. The encapsulated additive is formed by the step of forming a coating layer surrounding the solid cement additive. The coating layer includes the base film-forming monomer. The encapsulated additive is formed by the step of applying an overlay film-forming monomer to the coating layer surrounding the solid cement additive. The encapsulated additive is formed by the step of reacting the base film-forming monomer and the overlay film-forming monomer to produce a polymer shell. The polymer shell includes a crosslinked polymer. The polymer shell surround the solid cement additive. The polymer shell has a permeability to water allowing controlled release of the solid cement additive. The method includes the step of placing the additive slurry in a formation. The method includes the step of releasing the solid cement additive from the surrounding polymer shell.

In certain aspects, the cement includes a Portland cement, an aluminate cement, a Sorel cement, a phosphate cement, a pozzalonic cement, a slag cement, a geopolymer cement, and combinations of the same. In certain aspects, the mix water includes fresh water, sea water, a brine, and brackish water.

In certain aspects, the crosslinked polymer includes polyamides, aramides, and combinations of the same.

In certain aspects, the solid cement additive includes set accelerators, anti-gas migration additives, viscosifying agents, fluid loss control agents, cement dispersants, retarders, salts, polymers, and combinations of the same.

In certain aspects, the base film-forming monomer includes a hydrophobic monomer and the overlay film-forming monomer includes a hydrophilic monomer. In certain aspects, the hydrophobic monomer includes carboxylic acid chlorides, carboxylic acid anhydrides, and combinations of the same. In certain aspects, the hydrophilic monomer includes para-phenylenediamine, meta-phenylenediamine, ethylenediamine, hexamethylenediamine, polyethyleneimines, polyetheramines, and combinations of the same.

In certain aspects, the base film-forming monomer comprises a hydrophilic monomer and the overlay film-forming monomer comprises a hydrophobic monomer. In certain aspects, the hydrophilic monomer includes para-phenylenediamine, meta-phenylenediamine, ethylenediamine, hexamethylenediamine, polyethyleneimines, polyetheramines, and combinations of the same. In certain aspects, the hydrophobic monomer includes carboxylic acid chlorides, carboxylic acid anhydrides, and combinations of the same.

BRIEF DESCRIPTION OF THE DRAWINGS

These and other features, aspects, and advantages of the scope of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

Figures 1A, 1B, 1C:
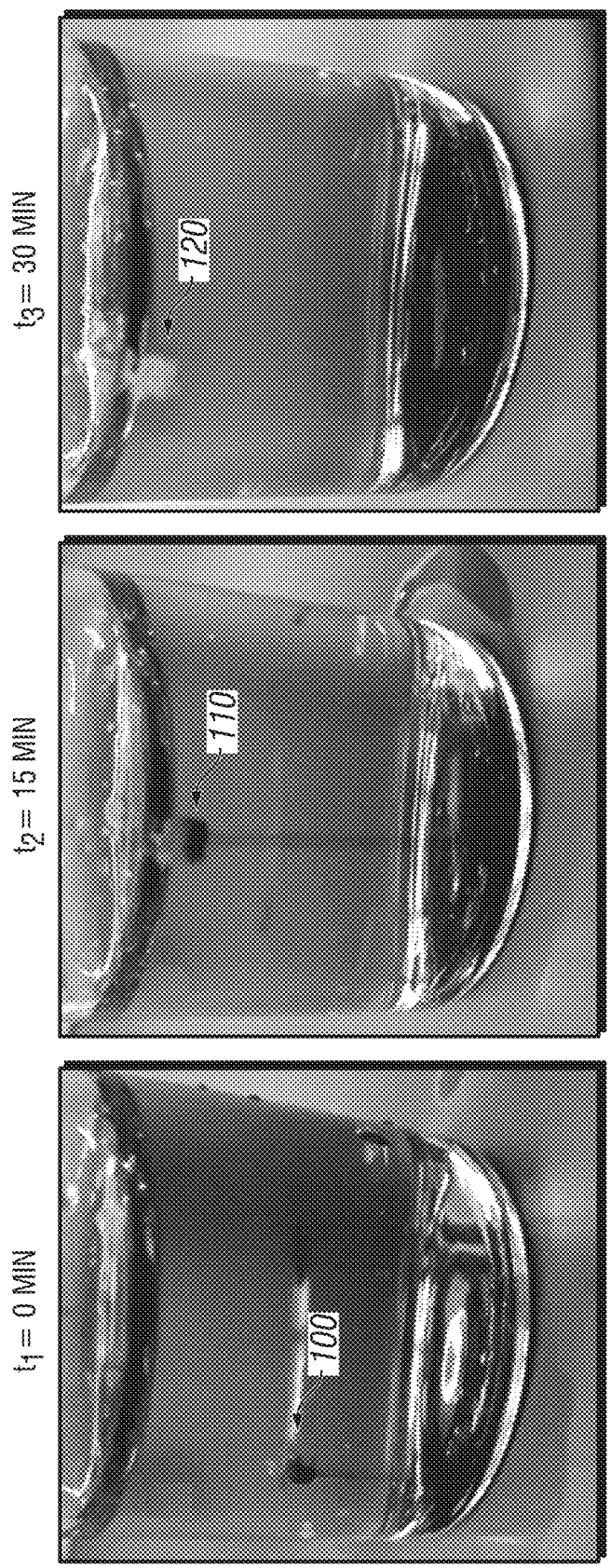
FIGS. 1A-C are photographical representations of the encapsulated additive samples from the example showing gradual release of the additive into water.

In the accompanying Figures, similar components or features, or both, may have a similar reference label.

DETAILED DESCRIPTION

So that the manner in which the features and advantages of the embodiments of composition and methods, as well as others, which will become apparent, may be understood in more detail, a more particular description of the embodiments of the present disclosure briefly summarized previously may be had by reference to the embodiments thereof, which are illustrated in the appended drawings, which form a part of this specification. While the scope of the composition and method will be described with several embodiments, it is understood that one of ordinary skill in the relevant art will appreciate that many examples, variations and alterations to the apparatus and methods described here are within the scope and spirit of the embodiments. Accordingly, the embodiments described are set forth without any loss of generality, and without imposing limitations, on the embodiments. Those of skill in the art understand that the scope includes all possible combinations and uses of particular features described in the specification.

Described here are compositions for cement additives. The cement additives can be encapsulated for use in cementing applications. The encapsulated additives can be used in downhole cementing applications.

As used here, "melting temperature" or "melting point" refers to the temperature at which a monomer or polymer transitions from a crystalline or semi-crystalline state to a liquid phase.

As used here, "softening temperature" refers to the minimum temperature, such that all temperatures greater than the softening temperature, that causes amorphous solids, with no definite melting point, becomes softer and rubbery (in the case of plastics), and ultimately become flowable liquids at sufficiently high temperatures.

As used here, "deform" means distort the shape or form of; make misshapen.

As used here, "degrade" means break down, break apart or deteriorate. Degrade can include forming new molecules or molecular fragments.

As used here, "aramide" refers to an aromatic polyamide. Terms such as "aramids," "aramides," "polyaramids," "polyaramides," "aramid polymers," "aramide polymers," and "aromatic polyamides" are used interchangeably. Commercial examples of aramides include para-aramides such as Kevlar® (available from DuPont®, Wilmington, Del.), Technora® (available from Teijin Aramid USA, Inc, Conyers, Ga.), Twaron® (available from Teijin Aramid USA, Inc, Conyers, Ga.), and Heracron® (available from Kolon Industries, Inc., Gwachon, Korea), and meta-aramides such as Nomex® (available from DuPont®, Wilmington, Del.) and Teijinconex® (available from Teijin Aramid USA, Inc, Conyers, Ga.). A para-aramide is an aramide where the polymer chain is connected via the para positions of an acyl group subunit or functional group. A meta-aramide is an aramide where the polymer chain is connected via the meta positions of an acyl group subunit or functional group.

The encapsulated additives include a solid cement additive and a polymer shell.

The solid cement additive is any solid, particulate that does not plastically deform or flow upon application of force, such that the particulates are free flowing and useful in downhole applications. The solid cement additive can include dry, gelled or gelatinous materials, so long as they are free flowing. The solid cement additive can have internal voids with a matrix-like structure. The solid cement additive can include solid particles. The solid cement additive can be any cement additive useful in cementing applications. The solid cement additive can be water-soluble. The solid cement additive can be selected from set accelerators, anti-gas migration additives, viscosifying agents, fluid loss control agents, cement dispersants, retarders, salts, polymers, and combinations of the same. Examples of set accelerators include calcium chlorides, calcium nitrite, and combinations of the same. In at least one embodiment, the solid cement additives can be water soluble. The solid cement additives can have a particle size, measured by the diameter. The median particle size (particle size $D_{50}$) can be about 600 micrometers (μm) or less and alternately about 500 μm or less. The median particle size can be measured by particle size measuring instruments. In at least one embodiment, the solid cement additive is solvent-free, that is, the solid cement additive is not solubilized in water for encapsulation purposes.

The polymer shell completely surrounds and encapsulates the solid cement additive. The polymer shell includes a crosslinked polymer. Examples of the crosslinked polymer include polyamides, aramides, and combinations of the same. In at least one embodiment, the crosslinked polymer is a polyamide that does not contain aromatic monomers. The polymer shell can have a permeability to water. The permeability of the polymer shell can function as a permeable membrane or a semi-permeable membrane. A semi-permeable membrane allows solvents, such as water to pass through, whereas a permeable membrane allows solvents such as water and solutes such as ions and molecules to pass through. In at least one embodiment, the polymer shell is permeable to water. The polymer shell can be heat resistant, such that the polymer shell does not deform or degrade at downhole temperatures. Downhole temperatures can be in the range between about 60 deg F. and about 550 deg F. The polymer shell can have a specific gravity between about 1.2 and about 1.4. The polymer shell can have a glass transition temperature of greater than about 150 deg C., alternately a glass transition temperature of about 200 deg C. The polymer shell does not dissolve in aqueous solutions. In some embodiments, the polymer shell does not dissolve in non-aqueous fluids. In at least one embodiment, the polymer shell is formed in the absence of a catalyst. In at least one embodiment, the polymer shell is formed at room temperature.

The encapsulated additives can be prepared by a dry coating method. Examples of dry coating methods include fluid dry coating and dry coating by hot rolling. The dry coating methods do not include a step of creating an emulsion. In a dry coating method two film-forming monomers are applied in sequence directly to the solid cement additive and the crosslinked polymer forms upon contact between the two film-forming monomers. The crosslinked polymer encapsulates the solid cement additive.

In the fluid dry coating method, the film-forming monomers can be both in fluid form or a combination where one is in molten form and the other is in solid form at the time of mixing.

Forming the Coating Layer

The base film-forming monomer is applied to the solid cement additive to form a coating layer surrounding the solid cement additive. The coating layer coats and surrounds each solid particle of the solid cement additive. The amount of the base film-forming monomer in the coating layer can be between about 1 wt. % and about 25 wt. % of the solid cement additive.

The base film-forming monomer can be applied as a base monomer fluid using a fluid dry coating method and alternately as a solid base monomer using a dry coating by hot rolling method.

In the fluid dry coating method, the base monomer fluid can first be produced. Examples of the base monomer fluid can include a base molten monomer and a base monomer solution. The base molten monomer can be obtained by heating the base film-forming monomer to a temperature at or greater than the melting temperature of the base film-forming monomer. The base monomer solution can be obtained by dissolving the base film-forming monomer in a non-aqueous solvent. The non-aqueous solvent can be an anhydrous or nearly anhydrous solvent containing less than about 5 wt. % water. Examples of the non-aqueous solvent can include alcohols, alcohol ethers, ethers, aromatic hydrocarbons, and halogenated solvents. The base film-forming monomer can be soluble in the non-aqueous solvent at room temperature with solubility of greater than about 50 wt. % and alternately greater than about 70 wt. %. Then, the base monomer fluid can be applied to the solid cement additive to form the coating layer surrounding the solid cement additive. Methods of applying the base monomer fluid can include pan coating and drum coating. In pan coating methods, the solid cement additives are tumbled in a rotating pan, alternately are tumbled in a drum equipped with vapor removal equipment, and alternately are placed in other devices while the base monomer fluid is applied in a controlled addition. Examples of controlled addition include spray coating and drip addition. In drum coating methods, the solid cement additive and base monomer fluid are mixed in a rolling drum, alternately on a moving belt, and alternately in a fluidized reactor. Vapor removal equipment can be used. When the base monomer fluid includes a base monomer solution, the non-aqueous solvent can be evaporated during the step of applying the base monomer fluid to the solid cement additive. It is understood, the coating layer surrounding the solid cement additives can begin to form during the step of applying the base monomer fluid to the solid cement additives and can then continue after the base monomer fluid has been applied to the solid cement additives. In at least one embodiment, the temperature of the solid cement additive with the coating layer is reduced to below the melting temperature at the end of the step of forming the coating layer.

In the dry coating by hot rolling method, the solid base monomer can include the base film-forming monomer in the form of pellets, flakes, granules, powders, and combinations of the same. The solid base monomer is blended with the solid cement additive to form an additive monomer blend. The additive monomer blend is hot rolled at a temperature at or greater than the melting temperature and alternately a temperature at or greater than the softening temperature of the base film-forming monomer. The additive monomer blend is hot rolled such that the base film-forming monomer forms a coated layer around the solid cement additive. The condensation reaction for forming the polymer shell of the vesicle is not initiated by the hot rolling process; however the elevated temperature can subsequently facilitate the condensation reaction between the base film-forming monomer and the overlay film-forming monomer. The time for dry coating by hot rolling can depend on the base film-forming monomer used, the temperature at which hot rolling occurs. In at least one embodiment, hot rolling can continue in the range from about 2 hours to about 24 hours. In at least one embodiment, hot rolling can continue in the range from about 2 hours to about 8 hours. Hot rolling continues until the base film-forming monomer forms the coating layer surrounding the solid cement additive. The extent and depth of the coating layer can be periodically measured by any known measurement method. In at least one embodiment, the depth of the coating layer can be measured by thermogravimetric analysis. In at least one embodiment, hot rolling continues until the coating layer uniformly surrounds the solid cement additive. As used throughout, "uniformly" means evenly with variation of less than about 5%. In at least one embodiment, the temperature of the solid cement additive with the coating layer is reduced to below the melting temperature at the end of the step of forming the coating layer. Hot rolling continues during the entirety of the step of forming the coating layer.

Adding the Overlay Monomer

The overlay monomer can be applied to the coating layer surrounding the solid cement additive. The amount of the overlay film-forming monomer applied to the coating layer can be in the range between about 1 wt. % and about 40 wt. % of the solid cement additive. The overlay film-forming monomer can be applied as an overlay monomer fluid using a fluid dry coating method and alternately as a solid overlay monomer using a dry coating by hot rolling method.

In the fluid dry coating method, the overlay monomer fluid can first be formed. Examples of the overlay monomer fluid include an overlay molten monomer and an overlay monomer solution. The overly molten monomer can be obtained by heating the overlay film-forming monomer to a temperature at or greater than the melting temperature of the overlay film-forming monomer. The overlay monomer solution can be obtained by dissolving the overlay film-forming monomer in a non-aqueous solvent. The non-aqueous solvent can be an anhydrous or nearly anhydrous solvent containing less than about 5 wt. % water. Examples of the non-aqueous solvent can include alcohols, alcohol ethers, ethers, aromatic hydrocarbons, and halogenated solvents. The base film-forming monomer can be soluble in the non-aqueous solvent at room temperature with a solubility of greater than about 50 wt. % and alternately greater than about 70 wt. %. The overlay monomer fluid can be applied to the coating layer surrounding the solid cement additive. Methods of applying the overlay monomer fluid can include pan coating and drum coating. In pan coating methods, the solid cement additive with the coating layer are tumbled in a rotating pan, alternately are tumbled in a drum equipped with vapor removal equipment, and alternately in other devices, while the overlay monomer fluid is applied in a controlled addition. Examples of controlled addition include spray coating and drip addition. In drum coating methods, the solid cement additive with coating layer and the overlay monomer fluid are mixed in a rolling drum, alternately placed on a moving belt, and alternately in a fluidized reactor. Vapor removal equipment can be used. When the overlay monomer fluid includes an overlay monomer solution, the non-aqueous solvent can be evaporated during the step of applying the base monomer fluid to the solid cement additive.

In the dry coating by hot rolling method, the solid overlay monomer can include the overlay film-forming monomer in the form of pellets, flakes, granules, powders, and combinations of the same. The solid overlay monomer can be mixed with the solid cement additive with the coating layer. The mixture is hot rolled at a temperature at or greater than the melting temperature of the overlay film-forming monomer. The extent and depth of the coating layer can be periodically measured by any known measurement method. In at least one embodiment, the depth of the coating layer can be measured by thermogravimetric analysis. In at least one embodiment, hot rolling continues until the coating layer uniformly surrounds the solid cement additive. The time for dry coating by hot rolling can depend on the overlay film-forming monomer used, the temperature at which hot rolling occurs. In at least one embodiment, hot rolling can continue in the range from about 2 hours to about 24 hours. In at least one embodiment, hot rolling can continue in the range from about 2 hours to about 8 hours. In at least one embodiment, the mixture is hot rolled at a temperature at or greater than the melting temperature of base film-forming monomer.

Forming the Encapsulated Additive

The overlay film-forming monomer reacts with the base film-forming monomer to produce the polymer shell, where the polymer shell contains the crosslinked polymer. In at least one embodiment, the polymer shell is formed while the solid particles are agitated. The crosslinked polymer surrounds the solid cement additive forming the polymer shell. The solid cement additives with coating layer can be subjected to vapor removal while the reaction to produce the crosslinked polymer occurs. The vapor removal methods can include placing the process under vacuum and alternately by flowing a stream of an inert gas, alternately air, over the solid cement additives.

The reaction between the base film-forming monomer and the overlay film-forming monomer can be a polymer condensation reaction. In at least one embodiment, the reaction is carried out at room temperature. The base film-forming monomer and the overlay film-forming monomer react at the point of contact between the two layers to form a polymer. The polymer condensation reaction can produce a byproduct. As an example, when the base film-forming monomer is a carboxylic acid chloride and the overlay film-forming monomer is a polyamine, the byproduct is hydrogen chloride. As used here, "polyamine" refers to an organic compound having more than one amino groups. The number of primary amine groups per a polyamine molecule is at least two. The hydrogen chloride can be removed by the vapor removal methods. By way of example, when the base film-forming monomer is a carboxylic acid anhydride and the overlay film-forming monomer is a polyamine, the byproduct is water which can be removed by the vapor removal methods. In at least one embodiment, the produced polymer is chemically inert and thermally resistant.

In at least one embodiment, the reaction between the base film-forming monomer and the overlay film-forming monomer begins to occur as the overlay monomer fluid is applied to the coating layer surrounding the solid cement additive and continues after all of the overlay monomer fluid is added. In at least one embodiment, the reaction between the base film-forming monomer and the overlay film-forming monomer begins to occur at some point after the overlay monomer fluid is applied to the coating layer surrounding the solid cement additive and continues after all of the overlay monomer fluid is added. In at least one embodiment, the reaction between the base film-forming monomer and the overlay film-forming monomer does not begin until after all of the overlay monomer fluid is applied to the coating layer surrounding the solid cement additive. In at least one embodiment, the reaction between the base film-forming monomer and the overlay film-forming monomer does not begin until the solid cement additive coated with the base film-forming monomer and the overlay film-forming monomer is heated to a temperature greater than the reaction temperature for either the base-film forming monomer or the overlay film-forming monomer.

The total amount of the base film-forming monomer and the overlay film-forming monomer can be in the range between about 5 wt. % and about 100 wt. % of the solid cement additive, alternately between about 2 wt. % and about 65 wt. % of the solid cement additive.

The step of applying the overlay monomer fluid to the coating layer surrounding the solid cement additives must occur after the step of forming the coating layer.

The solid cement additives surrounded by the polymer shell form the encapsulated additives. The size of the encapsulated additives can be measured by methods for measuring particle size distribution.

In at least one embodiment, the encapsulated additives do not contain agglomerations of the solid particles of the solid cement additive surrounded by a polymer shell. In at least one embodiment, the encapsulated additives can be sieved through sieves to remove any agglomerated particles of the encapsulated additives of sizes greater than about 1,000 µm, such as a mesh of size No. 18 (1.00 millimeter (mm)) with a 1.00 mm (1,000 µm) sieve opening. In at least one embodiment, the methods of forming the encapsulated are in the absence of a step to form an emulsion.

The base film-forming monomer can include a hydrophilic monomer and a hydrophobic monomer. The overlay film-forming monomer can include a hydrophilic monomer and a hydrophobic monomer. When the base film-forming monomer is a hydrophilic monomer, the overlay film-forming monomer is a hydrophobic monomer. When the base film-forming monomer is a hydrophobic monomer, the overlay film-forming monomer is a hydrophilic monomer.

The hydrophilic monomer can be a hydrophilic monomer having at least two reactive groups capable of reacting with those on the hydrophobic monomer. By way of example, when the hydrophilic monomer is a polyamine, the number of primary amine groups per molecule is at least two. In at least one embodiment, the hydrophilic monomer is a polyamine containing at least two or more primary amine groups. Examples of polyamines suitable for use as the hydrophilic monomers can include para-phenylenediamine, meta-phenylenediamine, ethylenediamine, hexamethylenediamine, polyethyleneimine, polyetheramines, and combinations of the same.

The hydrophobic monomer can be a hydrophobic monomer having at least two reactive groups capable of reacting with those on the hydrophilic monomer. In at least one embodiment, the hydrophobic monomer is an acyl chloride containing two or more acid chloride groups. By way of example, if the hydrophobic monomer is a carboxylic acid chloride, the number of acid chloride groups per molecule is at least two. Examples of hydrophobic monomers can include carboxylic acid chlorides, carboxylic acid anhydrides, and combinations of the same. Examples of carboxylic acid chlorides include tricarboxyl acid chlorides, dicarboxylic acid chlorides, and combinations of the same. Examples of tricarboxyl acid chlorides include 1,3,5-benzenetricarbonyl trichloride. Examples of dicarboxylic acid chlorides can include sebacoyl chloride, adipoyl chloride, and combinations of the same. Examples of carboxylic acid anhydrides can include hexanedioic di(2,4,6-trimethylbenzoic) acid, 1,4-phthalic di(2,4,6-trimethylbenzoic) anhydride, and combinations of the same.

The permeability of the polymer shell can control the rate of release of the solid cement additive. The amount of the base film-forming monomer and overlay film-forming monomer can be adjusted to control the reactivity rate between the base film-forming monomer and overlay film-forming monomer, the permeability, and the thickness of the resulting polymer shell. The molar ratio of the hydrophobic monomer to the hydrophilic monomer can be in the range between about 1:1 and about 2:1. Alternately, the molar ratio of reactive groups on the hydrophobic monomer to the reactive groups on the hydrophilic monomers is in the range between about 0.3 to about 1 and about 1 to about 0.3.

The encapsulated additives can be mixed with a cement slurry to produce an additive slurry. The cement slurry can include a cement and a mix water. The encapsulated additives are mixed with a cement slurry at any time prior to the cement slurry being introduced to a formation. In at least one embodiment, the encapsulated additives can be dry blended with the cement to form a free-flowing dry powder before the mix water is added to produce the cement slurry. In at least one embodiment, the encapsulated additives can be added to the mix water prior to the addition of the cement. In at least one embodiment, the encapsulated additives can be injected into the cement slurry or the mix water as part of a liquid emulsion.

The cement can be any type of cement useful in downhole cementing applications. Examples of the cement include a Portland cement, an aluminate cement, a Sorel cement, a phosphate cement, a pozzalonic cement, a slag cement, and a geopolymer cement. Examples of the mix water include fresh water, sea water, a brine, and brackish water. In at least one embodiment, two or more encapsulated additives can be added to the cement slurry, such that two or more different cement additives are carried into the cement slurry. In at least one embodiment, a blend of encapsulated additives and solid cement additives can be added to the cement slurry. The encapsulated additives can be mixed within the cement slurry to distribute the encapsulated additives through the additive slurry. Other additives can be added to the additive slurry. Examples of other additives can include dispersants, retarders, accelerators, viscosifiers, fluid loss control agents, light weight additives, high density additives, free water reducing agents, gas phase, surfactants, gas migration additives, lattices, elastomers, fibers, and combinations of the same.

The concentration of the encapsulated additives in the additive slurry will vary depending on the solid cement additive encapsulated and the intended function of the solid cement additive. The concentration of the encapsulated additive can be in the range from about 0.1% by weight of cement to about 25% by weight of cement.

The encapsulated additives can be added to the cement slurry in a continuous process or in a batch mixer.

The additive slurry can be placed in the formation according to any process for placing cementing in a wellbore or formation. In at least one embodiment, the cement slurry can be pumped downhole and can be allowed to set. In at least one embodiment, the cement slurry can be placed in an annulus between two casings and can be allowed to set. In at least one embodiment, the cement slurry can be pumped between a casing and the formation and allowed to set.

The polymer shell can be designed such that the solid cement additive is released from the polymer shell into the cement slurry prior to the cement setting. The polymer shell can be designed such that the solid cement additive is released during the preparation of the cement slurry, prior to pumping the cement slurry downhole, during the pumping process, but prior to placement of the cement slurry downhole, or after the cement is placed downhole. The design of the release of the solid cement additive can be based on the type of solid cement additive.

The solid cement additive can pass intact from the polymer shell.

After the solid cement additive is depleted within the polymer shell, a hollow polymer shell remains. Advantageously, the hollow polymer shell can be incorporated in the hardened cement imparting additional mechanical properties to the hardened cement. Advantageously, the hollow polymer shell is heat resistant.

EXAMPLE

Methods of Making Encapsulated Additive

Encapsulated additive samples were prepared by two different dry coating methods. The solid cement additive was a cement dispersant. The cement dispersant was a sulfonated-acetone-formaldehyde condensate (SAFC), a red powder, used for its strong colorimetric signal. The hydrophilic monomer used was 1,6-hexanediamine (HDA). The hydrophobic monomer used was 1,3,5-benzenetricarbonyl trichloride (BTCAC). Samples were prepared with the amount of each monomer shown in Table 1.

TABLE 1

Amount of monomers in each sample

| Sample | Method | Base Film-Forming Monomer | Amount of $1^{st}$ Monomer (g) | Wt. % of $1^{st}$ Monomer | Overlay Film-Forming Monomer | Amount of $2^{nd}$ Monomer (g) | Wt. % of $2^{nd}$ Monomer |
|---|---|---|---|---|---|---|---|
| 1 | 1 | HDA | 0.1 | 5 | BTCAC | 0.2 | 10 |
| 2 | 1 | HDA | 0.2 | 10 | BTCAC | 0.3 | 15 |
| 3 | 1 | HDA | 0.3 | 15 | BTCAC | 0.5 | 20 |
| 4 | 1 | HDA | 0.5 | 20 | BTCAC | 0.6 | 30 |
| 5 | 2 | BTCAC | 0.1 | 5 | HDA | 0.2 | 10 |
| 6 | 2 | BTCAC | 0.3 | 15 | HDA | 0.5 | 25 |
| 7 | 2 | BTCAC | 0.5 | 25 | HDA | 0.8 | 40 |

In a first method, Method 1, an amount of the hydrophilic monomer was added as the base film-forming monomer and an amount of the hydrophobic monomer was added as the overlay film-forming monomer. In a second method, Method 2, an amount of the hydrophobic monomer was added as the base film-forming monomer and an amount of the hydrophilic monomer was added as the overlay film-forming monomer. In each method the following steps were employed:

1. The base film-forming monomer and overlay film-forming monomer were warmed in separate water baths at 60 deg C. until melted to produce a base monomer fluid and an overlay monomer fluid.
2. Two grams of the cement additive was added to 20 milliliter (mL) vials.
3. A rolling oven was set at 120 deg F. (49 deg C.).
4. The base monomer fluid in the amount listed in Table 1 was added dropwise to the vials containing the cement additive.
5. The sample vials were placed into the rolling oven for 4 hours, with the rollers on, allowing coating of the samples with the base film-forming monomer forming the coating layer surrounding the solid cement additive.
6. The overlay monomer fluid in the amount listed in Table 1 was added dropwise to the vials containing the solid cement additives with the coating layer.
7. The sample vials were placed into the rolling oven for 4 hours, with the rollers on, allowing coating of the samples with the overlay film-forming monomer.
8. Allowing a polymer condensation reaction to occur between the base film-forming monomer and the overlay film-forming monomer to form the polymer shell.

The method resulted in encapsulated additives in the form of particles.

Methods of Using the Encapsulated Additive

The slow release of the encapsulated additives in an aqueous medium was evaluated by two methods. The first method was by visual means of observation where the Sample 1 particle of the encapsulated additive produced by Method 1 was placed in a beaker of water and the diffusion of the colored streak into the water from the encapsulated additive was observed.

FIG. 1A shows the encapsulated additive 100 at $t_1$ (0 minutes).

FIG. 1B shows the encapsulated additive 110 at $t_2$ (15 minutes). As can be seen by the darker stream, the solid cement additive is escaping the polymer shell. At $t_3$ (30 minutes), the solid cement additive is released completely. As shown in FIG. 1C, the solid cement additive is depleted from the polymer shell 120, where only the empty polymer shell 120 can be observed.

In a second method, quantitative measurements of the release rates for samples 1-4 were obtained using an ultraviolet-visible (UV/Vis) spectrophotometer ($\lambda_{max}$=420 nm, from Hach, Loveland, Colo.). The UV/Vis spectrophotometer was used to measure the absorbance of the released additive as a function of time and the weight percent of the first film-forming monomer. The results are shown in FIG. 2.

Figure 2:
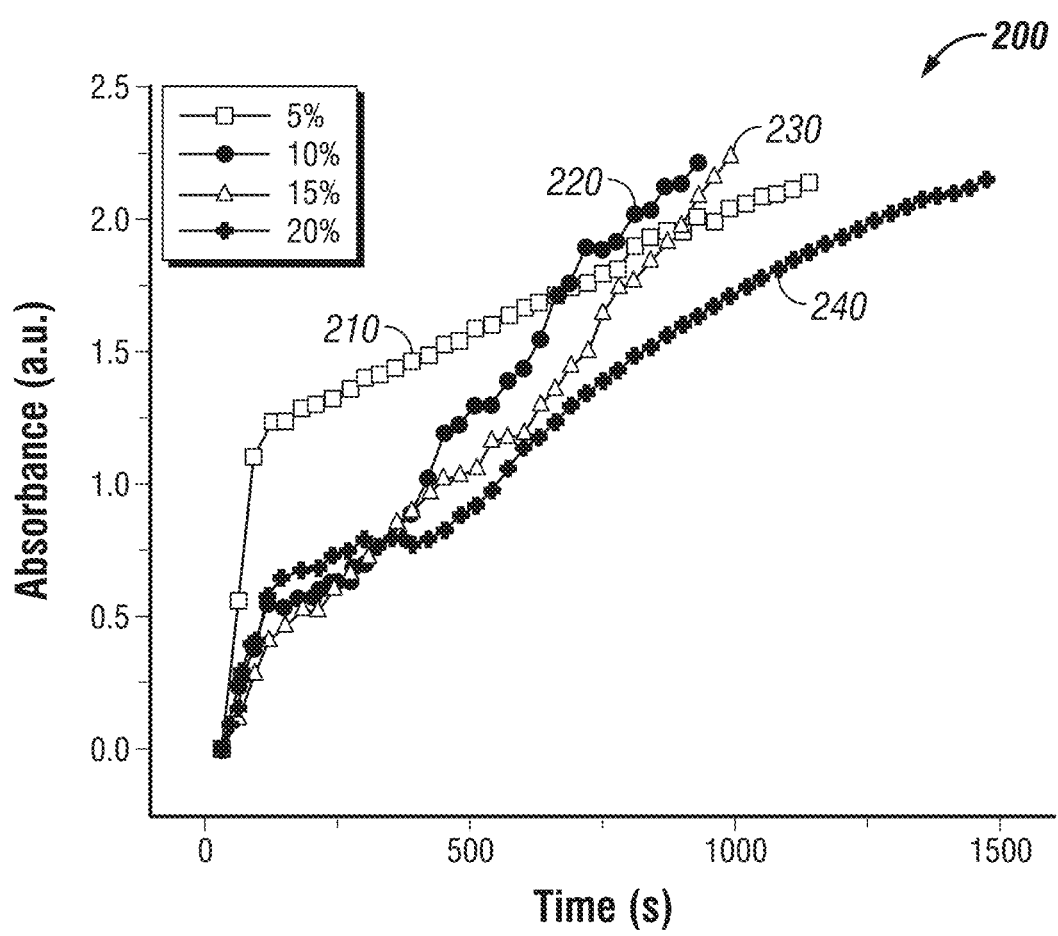
FIG. 2 is a graph of the release rates of the encapsulated additive as a function of time and the weight percent of polymer shell.

FIG. 2 is a graphical representation 200 showing UV/Vis absorbance of the released additive in Samples 1-4 in Table 1 as a function of time. The horizontal axis represents time in seconds. The vertical axis represents UV/Vis absorbance in arbitrary units. Square points 210 represent absorbance of Sample 1 in Table 1 having 5% wt. % HDA. Circular points 220 represent absorbance of Sample 2 in Table 1 having 10% wt. % HDA. Triangular points 230 represent absorbance of Sample 3 in Table 1 having 15% wt. % HDA. Cross-shaped points 240 represent absorbance of Sample 4 in Table 1 having 20% wt. % HDA.

Figure 3:
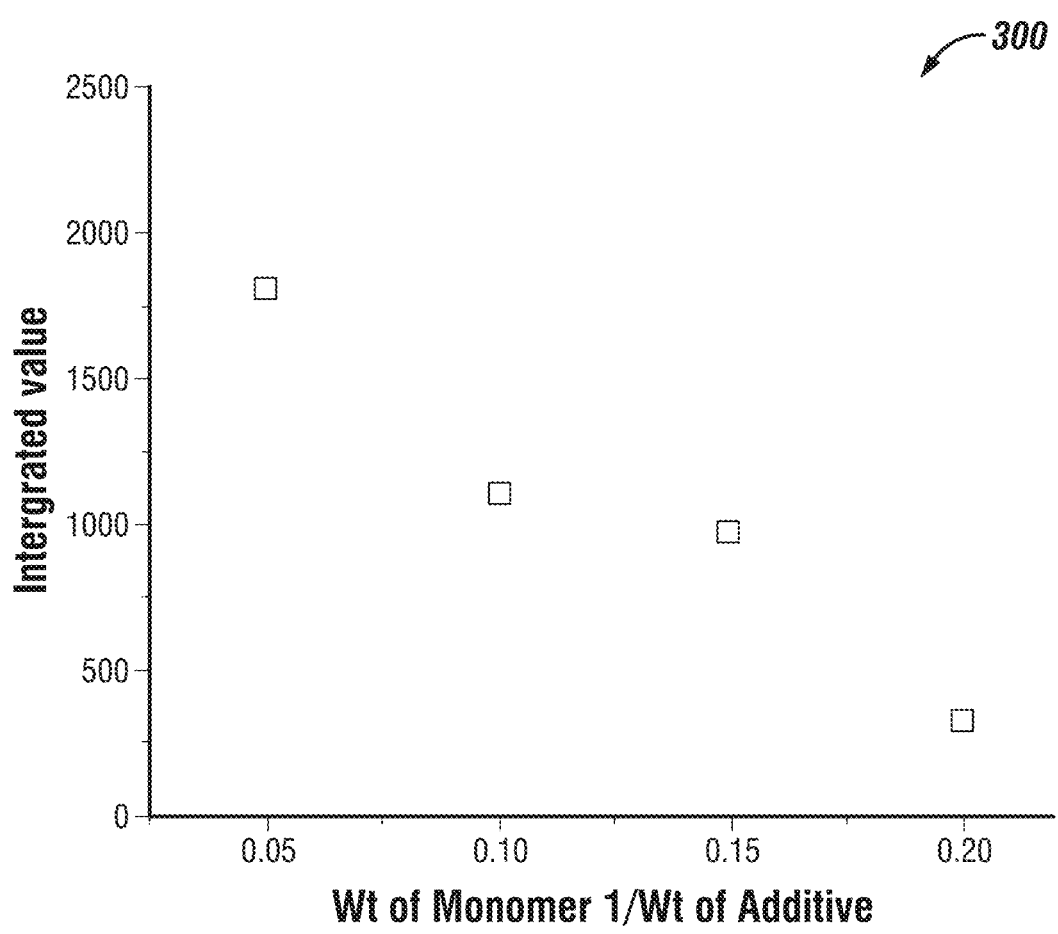
FIG. 3 is a graph of the decrease in solid cement additive concentration as the concentration of monomer increases.

The results show that as the weight percent of the first film-forming monomer is increased the additive release rate is reduced. The decrease in additive release rate as a function of the increase in polymer shell weight percent is shown in FIG. 3. FIG. 3 is a graphical representation 300 showing the additive absorbance, which is the integrated area of the curves shown in FIG. 2. The horizontal axis represents the weight ratio of the first film-forming for Samples 1-4 in Table 1. The vertical axis represents integrated values of the absorbance curves for Samples 1-4 shown in FIG. 2 in arbitrary units.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a," "an," and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That claimed is:

1. A method of encapsulating a solid cement additive for use in cementing applications, the method comprising the steps of:
    applying a base film-forming monomer to the solid cement additive using at least one of a fluid dry coating method and a dry coating by hot rolling method such that a coating layer is formed surrounding the solid cement additive, the coating layer comprising the base film-forming monomer;
    applying an overlay film-forming monomer to the coating layer surrounding the solid cement additive using the at least one of the fluid dry coating method and the dry coating by hot rolling method; and
    reacting the base film-forming monomer and the overlay film-forming monomer to produce a polymer shell,
    where the solid cement additive comprises solid particles,
    where the polymer shell comprises a crosslinked polymer, the crosslinked polymer comprising aramides,
    where the polymer shell surrounds the solid cement additive, and
    where the polymer shell has a permeability to water allowing controlled release of the solid cement additive.

2. The method of claim 1, where the base film-forming monomer comprises a hydrophobic monomer and the overlay film-forming monomer comprises a hydrophilic monomer.

3. The method of claim 2, where the hydrophobic monomer is selected from the group consisting of carboxylic acid chlorides, carboxylic acid anhydrides, and combinations of the same.

4. The method of claim 2, where the hydrophilic monomer is selected from the group consisting of para-phenylenediamine, meta-phenylenediamine, ethylenediamine, hexamethylenediamine, polyethyleneimines, polyetheramines, and combinations of the same.

5. The method of claim 1, where the base film-forming monomer comprises a hydrophilic monomer and the overlay film-forming monomer comprises a hydrophobic monomer.

6. The method of claim 5, where the hydrophilic monomer is selected from the group consisting of para-phenylenediamine, meta-phenylenediamine, ethylenediamine, hexamethylenediamine, polyethyleneimines, polyetheramines, and combinations of the same.

7. The method of claim 5, where the hydrophobic monomer is selected from the group consisting of carboxylic acid chlorides, carboxylic acid anhydrides, and combinations of the same.

8. The method of claim 1, where the solid cement additive is selected from the group consisting of set accelerators, anti-gas migration additives, viscosifying agents, fluid loss control agents, cement dispersants, retarders, salts, polymers, and combinations of the same.

9. The method of claim 1, where the size of the solid particles is less than about 500 micrometers.

10. The method of claim 1, where the amount of the base film-forming monomer in the coating layer is in the range from about 1 wt. % to about 25 wt. % of the solid cement additive.

11. The method of claim 1, where the crosslinked polymer further includes polyamides.

* * * * *